Sept. 9, 1947.  S. WINTERS  2,427,037
ELECTRIC ARC FURNACE
Filed Aug. 25, 1945

Inventor
Starling Winters
By
Attorneys

Patented Sept. 9, 1947

2,427,037

UNITED STATES PATENT OFFICE 2,427,037

ELECTRIC ARC FURNACE

Starling Winters, United States Army

Application August 25, 1945, Serial No. 612,698

5 Claims. (Cl. 13—10)

(Granted under the act of March 3, 1883, as amended April 30, 1928; 370 O. G. 757)

The invention described herein may be manufactured and used by or for the Government for governmental purposes, without payment to me of any royalty thereon.

This invention relates to electric furnaces such as are used for metallurgical purposes, and especially to those wherein the necessary heat is derived from an electric arc established between two or more electrodes and the furnace charge.

In the operation of furnaces of the type described, it is difficult to maintain the optimum current, particularly during the melt-down portion of the heat. As the metallic furnace charge melts away under an electrode, the arc length tends to increase, permitting the arc voltage to rise and the electrode current to decrease. The increase in voltage and decrease in current, if gradual, causes a compensating action of the electrode control to maintain the arc length. When a very rapid increase in arc length occurs, due to sudden settling of the charge under the electrode, the speed of lowering of the electrode is insufficient to prevent breaking the arc. When the arc is broken, the electrode must come into contact with the furnace charge in order to again strike an arc, and when this occurs practically all of the power input for this electrode is absorbed in the furnace transformer, leads and external reactors.

Another difficulty with conventional electric arc furnaces is that when the furnace charge settles, or "caves in," it piles against the sides of the electrodes, thus producing relatively prolonged short circuits until the electrodes can be withdrawn from contact therewith.

It is among the objects of the present invention to eliminate, or materially reduce, the foregoing and other difficulties inherent in the operation of conventional electric arc furnaces.

Another object is to provide a method and apparatus for controlling electric arc furnaces wherein greater efficiency and economy will be obtained.

More specifically, the present invention seeks to entirely eliminate the hereinbefore described prolonged short circuits in the arcs by providing relative oscillatory movement between the furnace charge and the electrodes; and also by widely spacing the electrodes thereby permitting the use of a furnace transformer having substantially less leakage reactance, and enabling the entire elimination of the usually necessary external supplementary reactances. In addition to the foregoing, the increased paths of resistance through the furnace charge from electrode to electrode serve to: 1, increase the heat absorbed by the charge; 2, promote more uniform heat transfer throughout the charge; 3, increase the melting rate; 4, promote better mixing; and 5, decrease localized boiling in the vicinity of the electrodes.

To the foregoing and other useful ends, the invention comprises structural features hereinafter described and claimed, and shown in the accompanying drawings, in which:

Figure 1:
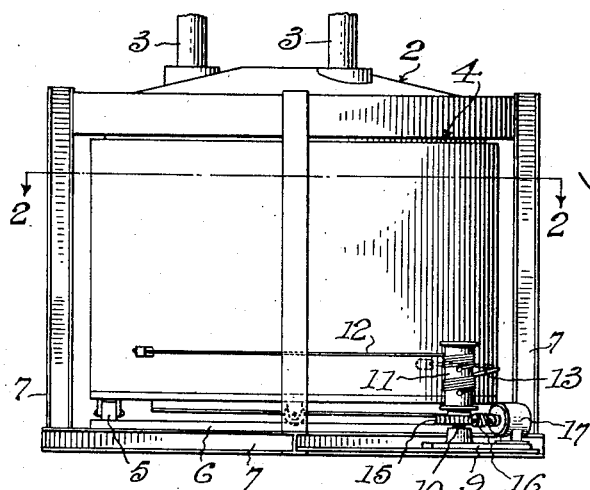
Figure 1 is a side elevation of an electric arc furnace constructed in accordance with the teachings of the present invention.

Referring more particularly to the drawings, the numeral 1 designates the circular hearth of the electric arc furnace of the present invention which comprises the usual refractory brickwork and metallic shell. The hearth 1 is provided with a removable refractory brickwork roof, or cover 2 through which vertically disposed electrodes 3 extend. These electrodes 3 are shown as being three in number and disposed to occupy equidistant positions at the apices of a unilateral triangle in accordance with prevalent practice. It is to be observed, however, that the spacing between these three vertically disposed electrodes of the present invention is considerably greater than that of the usual electric arc furnace; and the purpose of this will be referred to more specifically hereinafter. In order to maintain proper relationship with respect to the furnace charge, the electrodes 3 are raised and lowered by means of apparatus of suitable design, the said apparatus forming no part of the present invention and therefore is neither shown in the drawings nor specifically referred to herein.

The upper edge of the hearth 1, and the correspondingly adjacent portion of the under side of the roof 2, provide between them a labyrinth type of seal, as shown at 4, for the purpose of preventing undue heat loss by direct radiation.

Referring again to the matter of the spacing of the vertically disposed electrodes 3, the solid line illustrations of Figure 1 illustrate the degree of spacing contemplated by the present invention; whereas the dotted line illustrations are representative of the spacing practices of the prior art.

The diameter of a circle locating the centers of the electrodes 3 of the furnace of the invention is about twice as large as the diameter of the circle locating the centers of the electrodes of the prior art, as indicated in Figure 1. In addition, the annular area of the electrodes of the furnace of the invention is about eight times as great as the total sectional areas of the electrodes of the prior art.

As previously stated, the teachings of the invention contemplate relative oscillatory movement between the furnace charge and the electrodes by relative movement between each electrode and the hearth of the furnace. This may be accomplished in several different ways, preferably by oscillating the hearth while maintaining the electrodes in axially stationary position. The relative oscillatory movement should be sufficient to cover the entire furnace charge, and the extent of such movement on the part of the furnace hearth depends, of course, on the number of electrodes employed. Accordingly, in the case of the three equidistantly spaced electrodes of the illustrative embodiment, it is only necessary to impart relative oscillatory movement to the extent of one hundred and twenty degrees (120°) in order to cover the entire furnace charge.

The hearth 1 carries on its bottom, and adjacent its periphery, a series of equidistantly spaced casters 5 which ride in a suitable circular channel or way 6, the latter being supported by the usual assembly of structural members generally indicated at 7.

In order to permit the hearth to tilt and thereby pour the molten charge into the usual ladle or the like, the assembly of structural members may be arranged to tilt in any convenient manner; but this, like the previously-referred to means for raising and lowering the roof 2 and/or the electrodes 3, forms no part of the invention and is likewise neither shown in the drawings nor more specifically referred to herein.

The assembly 7 of structural members carries a platform 9 on which there is mounted a standard 10 for supporting a vertically extending rotatable drum 11. This rotatable drum 11 carries in superposed relation a pair of cables as at 12 and 13, the said cables extending in opposite directions from the drum to suitably distant and opposed points on the hearth 1 to which they are secured. Rotation is imparted to the drum through a worm gear 15, the latter receiving motion from a worm 16 which is carried on the driving shaft of an adjacently disposed reversible electric motor 17.

Figure 4:
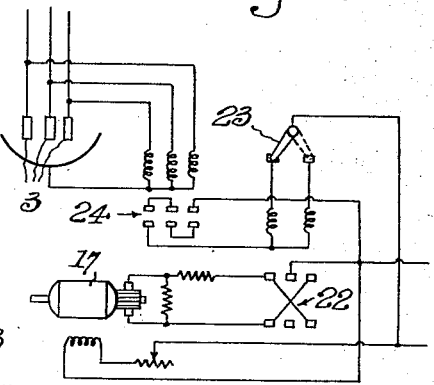
Figure 4 is a wiring diagram illustrating the electrical controls of the apparatus of the invention.

Referring to the diagram of Figure 4, the armature of the reversible electric motor 17 which oscillates the hearth is reversed by the action of an armature reversing contactor 22. This armature reversing contactor 22 is in turn actuated by a reversing limit switch 23, and the contacts of three arc-voltage relays 24. The three voltage relays 24 are adjusted so that when an individual electrode arc voltage is too low, the contacts open, thus opening the armature reversing contactor 22 and stopping the oscillatory motion of the hearth. This prevents the electrodes 3 from bumping against scrap and also automatically shuts down the oscillation of the hearth during the refining stage when it is not needed, since lower voltages are used for refining. Shunt and series resistors are provided in the armature circuit for the purposes of regenerative braking and limiting armature current, respectively.

Figure 2:
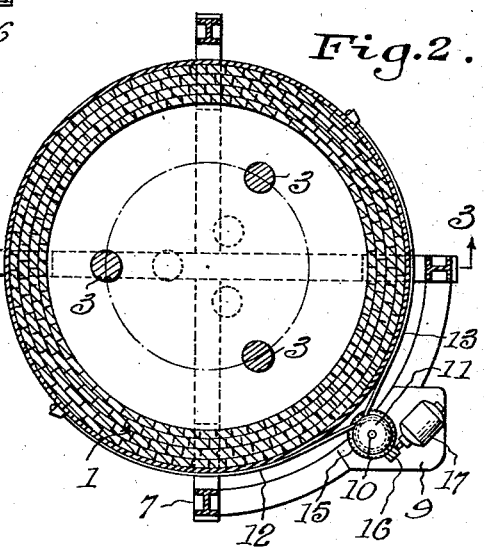
Figure 2 is a sectional plan, being taken on the line 2—2 of Figure 1.
Figure 3:
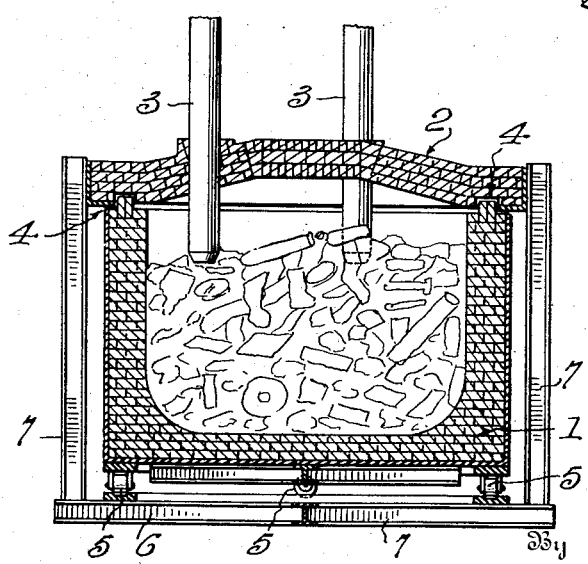
Figure 3 is a sectional elevation on the line 3—3 of Figure 2.

The oscillation of the hearth, in accordance with the teachings of the invention, sweeps an annular horizontal area of charge which passes through the projected areas of the electrodes 3. As previously stated, the diameters of the circles locating the centers of the electrodes 3 of the present invention, conventionally disposed electrodes shown in dotted lines in Figure 2, bear the ratio of approximately 2 to 1, and the annular area of the said electrodes 3 is approximately eight (8) times as great as the total sectional areas of the conventionally disposed electrodes. In other words, eight (8) times as much scrap will be melted before the electrodes reach the depth corresponding to impending "cave-in" against the electrodes. However, since the melting is applied uniformly against a much greater volume of the scrap, settling takes place gradually and uniformly, and practically eliminates cave-ins, and reduces the number of arc short circuits.

The wide spacing of the electrodes 3 in accordance with the teachings of the invention has the further advantage of greatly increasing the magnetic flux traversing the steel scrap. This not only puts more heat into the metal due to magnetic hysteresis, but increases certain resistance losses (i. e. $I^2R$ losses) in the iron due to the heavy currents traversing the longer electrical paths from electrode to electrode through the charge.

The increased magnetic flux traversing the charge of steel scrap, and between the wider spaced electrodes, increases the reactance of the power circuit in the vicinity of the arcs, thus permitting the use of a transformer having lower leakage reactance and eliminating the need for external current-limiting reactors.

Having thus described my invention, what I claim as new and wish to secure by Letters Patent is:

1. In an electric arc furnace, a furnace hearth, a plurality of vertically positioned electrodes disposed to extend into said hearth, means including a motor for effecting relative oscillatory movement between said hearth and said electrodes, and means responsive to the individual electrode arc voltage for operating said motor.

2. In an electric arc furnace, a furnace hearth, a plurality of vertically positioned electrodes disposed to extend into said hearth, means including a motor for imparting relative oscillatory movement to said hearth while maintaining said electrodes substantially stationary, and means responsive to the individual electrode arc voltage for operating said motor.

3. In an electric arc furnace, a furnace hearth, a plurality of vertically positioned electrodes disposed to extend into said hearth, means for rotatably supporting said hearth, a vertically disposed rotatable drum, cables connecting said drum and said hearth, a reversible motor for rotating said drum, and means responsive to the individual electrode arc voltage for operating said motor.

4. In an electric arc furnace, a furnace hearth, a plurality of vertically positioned electrodes disposed to extend into said hearth, means for rotatably supporting said hearth, a vertically disposed rotatable drum, cables connecting said drum and said hearth, a reversible motor, a speed reduction unit connecting said motor and said drum, and means responsive to the individual electrode arc voltage for operating said motor.

5. In an electric arc furnace, a furnace hearth, a plurality of vertically positioned electrodes disposed to extend into said hearth, means for rotatably supporting said hearth, a vertically disposed rotatable drum, cables connecting said drum and said hearth, a reversible motor, a speed reduction unit connecting said motor and said drum, an armature reversing contactor for said motor, and means responsive to the individual electrode arc voltage for operating said armature reversing contactor.

STARLING WINTERS.

REFERENCES CITED

The following references are of record in the file of this patent:

UNITED STATES PATENTS

| Number | Name | Date |
| --- | --- | --- |
| 586,686 | Heath | July 20, 1897 |
| 706,099 | Parker | Aug. 5, 1902 |
| 1,378,972 | Moore | May 24, 1921 |
| 1,531,811 | Peterson | Mar. 31, 1925 |
| 1,580,060 | Luke | Apr. 6, 1926 |